United States Patent
Ciulla

(10) Patent No.: US 8,371,950 B2
(45) Date of Patent: Feb. 12, 2013

(54) ASSEMBLY FOR COUPLING A CONSTANT VELOCITY JOINT WITH A MOTOR VEHICLE HUB BEARING UNIT

(75) Inventor: Luca Ciulla, Turin (IT)

(73) Assignee: Aktiebolaget SKF, Göteborg (SE)

( * ) Notice: Subject to any disclaimer, the term of this patent is extended or adjusted under 35 U.S.C. 154(b) by 137 days.

(21) Appl. No.: 12/966,491

(22) Filed: Dec. 13, 2010

(65) Prior Publication Data

US 2011/0151982 A1   Jun. 23, 2011

(30) Foreign Application Priority Data

Dec. 18, 2009   (EP) .................................. 09179820

(51) Int. Cl.
 *F16D 1/092*   (2006.01)
(52) U.S. Cl. ........................................ 464/178; 464/182
(58) Field of Classification Search .................. 464/178, 464/182, 906; 403/359.2, 359.6; 384/544, 384/589
See application file for complete search history.

(56) References Cited

U.S. PATENT DOCUMENTS

| | | | | |
|---|---|---|---|---|
| 1,803,995 | A * | 5/1931 | Chilton ...................... | 403/359.6 |
| 6,354,952 | B1 | 3/2002 | Boulton et al. | |
| 6,648,518 | B2 * | 11/2003 | Uchman ...................... | 384/544 |
| 6,981,800 | B2 * | 1/2006 | Shibuya ........................ | 384/544 |
| 7,850,531 | B2 * | 12/2010 | Brunetti et al. ............... | 464/178 |
| 2002/0070506 | A1 | 6/2002 | Krude | |
| 2010/0197414 | A1 * | 8/2010 | Concu ........................... | 464/178 |

FOREIGN PATENT DOCUMENTS

| | | |
|---|---|---|
| DE | 19546021 A1 | 6/1996 |
| DE | 19518697 A1 | 11/1996 |
| EP | 1126187 A2 | 8/2001 |
| EP | 1508710 A1 | 2/2005 |
| FR | 2367942 A1 | 5/1978 |
| GB | 2041162 A | 9/1980 |

\* cited by examiner

*Primary Examiner* — Gregory Binda
(74) *Attorney, Agent, or Firm* — Mark A. Ussai; Bryan Peckjian

(57) ABSTRACT

A coupling assembly for connecting a hub bearing unit with a constant velocity joint includes a bell member of a constant velocity joint having a tubular section disposed about a driving ring and having an end surface facing a hub member end surface and an inner circumferential surface defining a bore. The inner surface has inner splines engageable with driving ring outer splines and a tapering surface section. A sealing member is disposed between the hub and bell end surfaces and seals the space between the surfaces. An annular retainer disposed within the bell bore has a tapering outer circumferential surface engageable with the inner surface section of the bore such that the tubular section is retained between the retainer outer surface and the hub end surface, preventing disengagement of the splines and compressing the sealing member between the end surfaces. A connector connects the retainer with the hub.

10 Claims, 2 Drawing Sheets

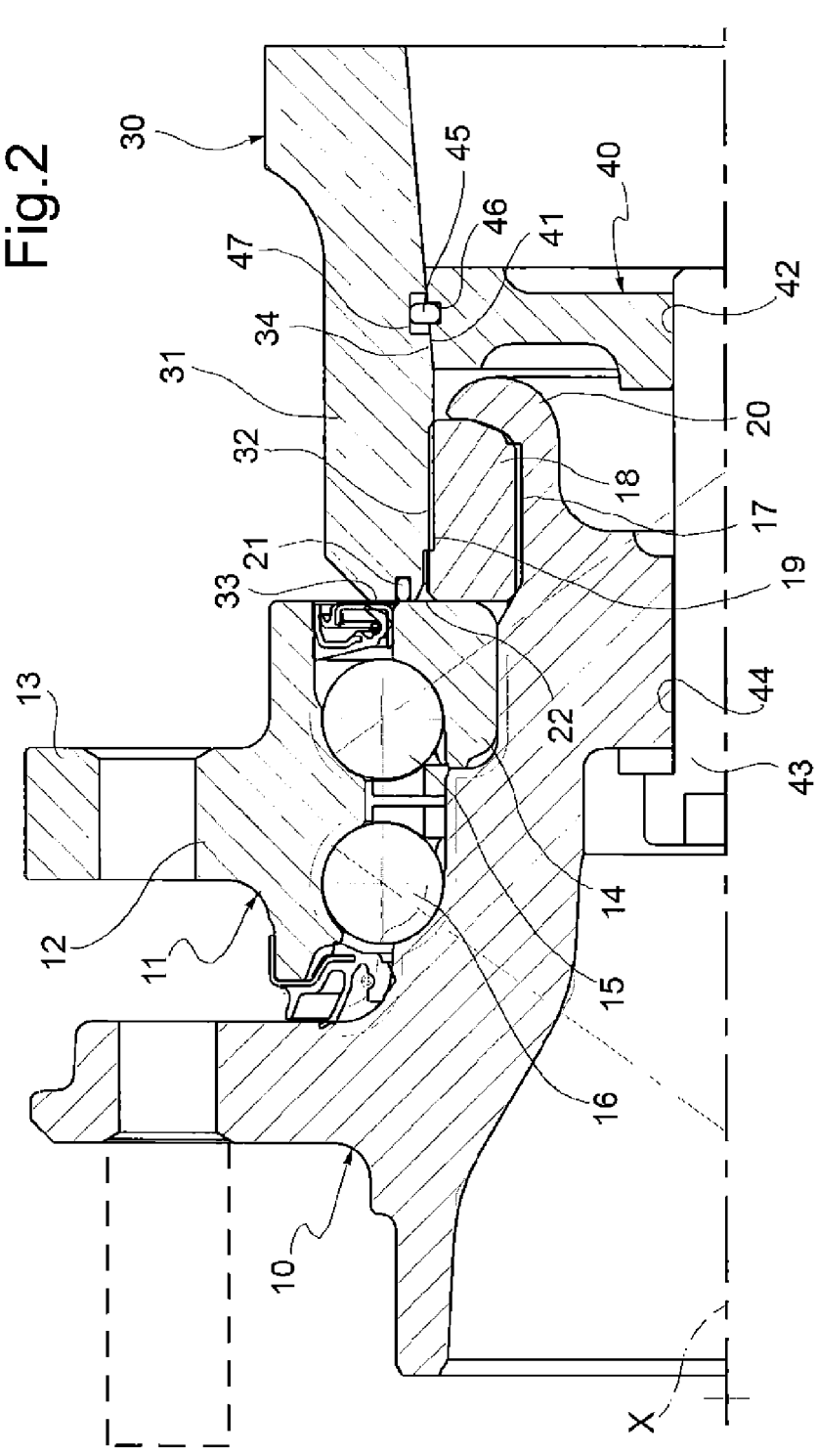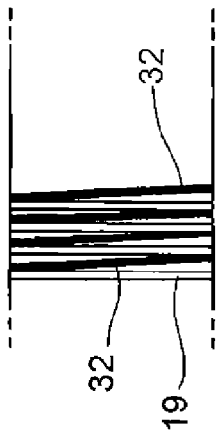

ASSEMBLY FOR COUPLING A CONSTANT VELOCITY JOINT WITH A MOTOR VEHICLE HUB BEARING UNIT

CROSS-REFERENCE TO RELATED APPLICATIONS

This application claims priority to European patent application no. EP09179820, filed on Dec. 18, 2009, which is incorporated fully herein by reference.

BACKGROUND OF THE INVENTION

The present invention relates to motor vehicle wheel hub assemblies, and more particularly to coupling assemblies for connecting constant velocity joints and a hub bearing units.

US Patent Application No. 2002/0070506 A1 and U.S. Pat. No. 6,354,952 each disclose arrangements in which the hub of the wheel receives the driving torque from the bell of the constant velocity joint through a straight splined coupling. To this end, fixed on the hub is a ring with an axial outer toothing/splines that is telescopically inserted in a tubular projection with an inner axial toothing of the outer part or "bell" of the constant velocity joint. The toothed ring and the tubular projection are both provided with a respective circular groove in which an elastic, open ring (or circlip or Seeger ring) is fitted in order to axially lock the hub to the joint.

The known arrangements as described above are generally effective, but have drawbacks, such as for example, insufficient sealing. The elastic ring typically has two gripping arms at its ends that project through a slot formed at the axially outer end (or outboard end) of the joint bell. As shown in FIG. 5 of US 2002/0070506, a rubber sleeve may be provided to cover the slot, and thereby seal it. Such a sealing arrangement often permits water or other fluids to penetrate, especially through the slot formed at the end of the joint bell, into the splined interface zone. Rust formed at the interface of the splined coupling renders the disassembling operation of the hub-bearing unit from the constant velocity joint particularly difficult, besides shortening the life of these members.

Further, a conventional straight splined coupling has the drawback of a relatively high level of noise that can be heard when the vehicle is put into reverse, due to to the circumferential or angular play between the splines on the bell of the constant velocity joint and the driving ring fixed on the hub.

SUMMARY OF THE INVENTION

It is a primary object of the invention to optimize the hermetic sealing action at the interface zone between the constant velocity joint and the hub bearing unit, closing the passages through which water may leak into the inner parts of the constant velocity joint and preventing water from accessing the splined coupling between the joint and the hub-bearing unit.

Another object of the invention is to facilitate the steps of assembling and disassembling the hub-bearing unit to and from the constant velocity joint.

These objects are achieved, according to an aspect of the present invention, which is a coupling assembly for releasably connecting a motor vehicle hub bearing unit with a constant velocity joint, the hub bearing unit including a rotatable hub having a driving ring with outer splines and a rotatable hub member with an end surface. The coupling assembly comprises a bell member of the constant velocity joint, the bell member including a generally tubular section disposed about the driving ring, the tubular section having an end surface facing the hub member end surface and an inner circumferential surface defining a bore, the inner surface having a plurality of inner splines engageable with the driving ring outer splines and a generally conical, tapering surface section. An annular sealing member is disposed between the hub member end surface and the bell tubular section end surface and configured to substantially seal the space between the two end surfaces. A generally annular retainer is disposed within the bell tubular section bore and has a generally conical, tapering outer circumferential surface engageable with the tapering inner surface section of the bore such that the bell tubular section is retained generally between the retainer outer surface and the hub end surface to prevent disengagement of the hub and bell splines and to compress the sealing member between the hub member end surface and the bell end surface. Further, a connector is configured to connect the retainer with the hub.

Preferred embodiments of the invention are set forth in the dependent claims. Briefly summarized, the invention provides a rigid circular member received in the cavity of the bell member of the constant velocity joint. That circular member provides a rigid, conical peripheral edge which tapers in an axially outward direction and axially abuts against a correspondingly shaped conical surface formed within the cavity of the bell member. The hub and the constant velocity joint are releasably axially secured by a fastening means releasably connecting the circular member to the hub in an axially tractive relationship. That axial traction causes axial compression of an annular sealing gasket fitted between the bell member and the hub-bearing unit. As a result, a continuous sealing action is provided around the engaged splines of the bell member and of the driving ring fixed to the hub.

It is a further object of the invention to overcome the above mentioned drawback concerning noise. This object is achieved, according to an aspect of the invention, by a coupling 1) where the splines of the driving ring extend substantially axially and the splines of the bell tubular section extend at least partially circumferentially or 2) the splines of the bell tubular section extend substantially axially and the splines of the driving ring extend at least partially circumferentially. The splined coupling is modified so that one of the two coupling members, i.e. the joint bell or the driving ring, has involute or circumferentially extending splines and the other member has straight axial splines. Due to the engagement of the different splines, the relative angular or circumferential play between the constant velocity joint and the hub is "taken up" or substantially eliminated.

BRIEF DESCRIPTION OF THE DRAWINGS

A few preferred, but not limiting embodiments of the invention will now be described, reference being made to the accompanying drawings, in which:

FIG. 1 is a partial axial cross sectional view of a first embodiment of an assembly comprising a constant velocity joint coupled to a hub-bearing unit;

FIG. 2 schematically depicts the layout of the splines of two members of the assembly of FIG. 1 coupled together in accordance with the invention.

DETAILED DESCRIPTION OF THE INVENTION

Figure 3:
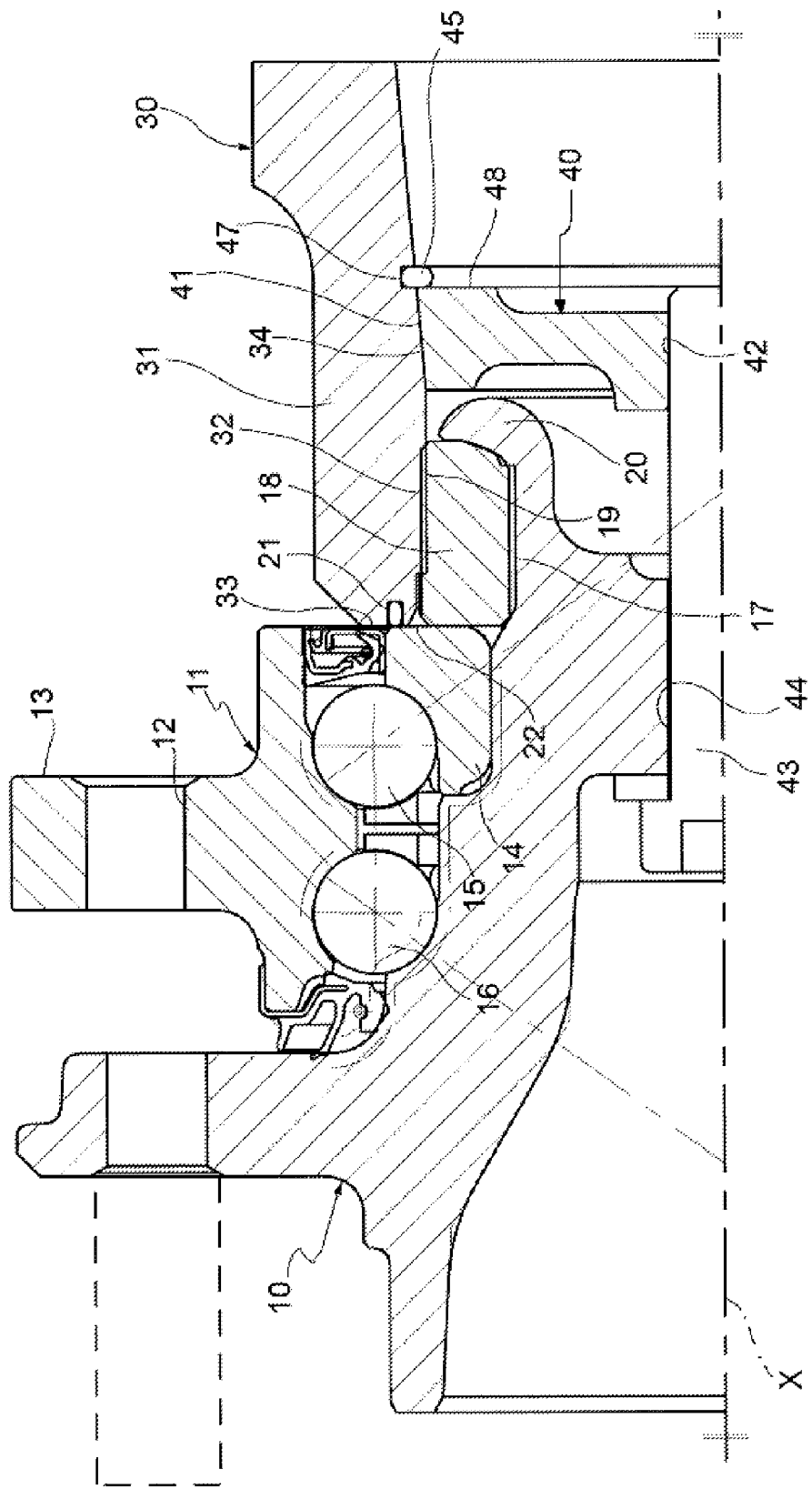
FIG. 3 is a view, similar to FIG. 1, of a second embodiment of the invention.

With reference initially to FIG. 1, a hub 10 for a driving wheel of a motor vehicle is rotatably mounted in a conventional suspension (not shown) of the vehicle through a bearing unit 11 which includes an outer stationary ring 12 having a flange 13 fixed to the suspension by threaded fasteners (e.g., bolts, none shown). Mounted on the hub 10 is a rotatable member, preferably an inner bearing ring 14 that forms the inner raceway for a set of rolling elements, preferably balls 15, of the bearing unit.

The hub has a cylindrical surface 17 proximal to an axially outer end, onto which is fixed a driving ring 18 with a plurality of outer axial splines or teeth 19 for transferring the driving torque from the bell 30 of the constant velocity joint to the hub 10. As used herein, terms such as circumferential, radial, or axial are to be construed with respect to the central axis of rotation x of the hub.

The driving ring 18 is securely axially locked against the inner bearing ring 14 by cold forming, preferably by orbital rolling, of an end edge 20 of the hub 10. At its axially outer side, the joint bell 30 forms a tubular section 31 disposed about the driving ring 18 in a "telescopic" arrangement. The bell tubular section 31 has an end surface 33 facing a hub member end surface 22 and an inner circumferential surface defining a bore, the inner surface having a plurality of inner splines 32 engageable with the driving ring outer splines 19 and a generally conical, tapering surface section 34. Preferably, the two sets of engaging splines 19, 32 are of different types; specifically, the outer splines 19 of the driving ring are axially straight, i.e., extend axially, and the inner splines 32 of the joint bell section 31 are "involute", i.e., extend at least partially circumferentially, or vice-versa. The helical pitch of the involute splines 32 substantially reduces or eliminates angular "play" between the hub 10 and the joint bell 30.

More specifically, the helical pitch of the involute splines 32 is preferably long enough to allow an initial substantially effortless insertion of the driving ring 18 into the joint bell 30, most preferably with a slight angular play between the two members 18, 31. As the insertion process continues, the flanks of the straight axial splines 19 and the involute splines 32 come into contact, which "takes up" the angular play between the hub 10 and the joint bell 30. Preferably, the helical pitch of the involute splines is chosen so as to require some degree of axial force to reach the fully coupled condition shown in the drawing. Such a spline construction is schematically shown in FIG. 2, where each involute spline (depicted in black) contacts, at a first end thereof, one of the two successive straight axial splines between which it is inserted and, at its second end, it touches the other axial spline.

As clearly shown in FIG. 1, the outer diameter of the driving ring 18 is lesser than the outer diameter of the inner bearing ring 14. An elastic, generally annular sealing member or ring 21 is axially compressed between two radial surfaces facing one another, namely the axially outer surface 33 of the bell 30 and a facing axially inner surface 22 of the bearing ring 14.

The hub 10 and the constant velocity joint 30 are axially removably joined by a rigid, generally circular or annular retainer 40 which is received in the bore of the joint bell section 31 and substantially closes an axial end of the bore. The retainer 40 has a generally conical, outer circumferential surface 41 which tapers in an axially outward direction. The retainer outer surface 41 axially abuts against the correspondingly shaped, generally conical surface section 34 formed within the bore of the bell tubular section 31. Thereby, the bell tubular section 31 is retained generally between the retainer outer surface 41 and the hub end surface 22, which prevents disengagement of the hub and bell splines 19, 32 and compresses the sealing member/ring 21 between the ring end surface 22 and the bell end surface 33.

Further, the retainer 40 has a central threaded bore 42 through which extends a connector 43 configured to connect the retainer 40 with the hub 10. The connector 43 preferably includes a threaded member, for example a screw, extending axially through a hub central bore 44 and threadably engaged with the retainer bore 42, which preferably can be tightened from the outside. Tightening the threaded member 43 axially displaces the hub 10 toward the bell 30 and causes axial compression of the sealing ring 21, thereby assuring a particularly efficient sealing action at the interface between the hub 10 and the constant velocity joint 30.

Preferably, a circlip or snap ring (or Seeger ring) 45 is provided at the interface between the retainer 40 and the bell member 30 in order to keep the retainer 40 in position when the threaded member 43 is loosened for servicing the vehicle, since "unscrewing" the threaded member 43 tends to push the retainer 40 backwards (or axially inwardly). In the embodiment of FIG. 1, the circlip 45 is partly disposed in an annular groove 46 extending radially inwardly from the outer circumferential surface 41 of the retainer 40 and protrudes radially outwardly of the generally conical surface section 34 so as to engage another annular groove 47 extending radially outwardly from the tapering surface section 34 of the bell tubular section bore. In the embodiment of FIG. 3, the circlip 45 is partly disposed within the annular groove 47 extending radially outwardly from the generally conical surface section bore and protrudes radially inwardly beyond the surface 34, so as to provide a stop which engages an axially inner end 48 of the retainer 40. In the construction shown in FIG. 3, the snap ring 45 is particularly easy to remove without the necessity of applying a substantial force to the ring 45.

As will be appreciated, axial locking by means of the inner retainer 40 avoids the conventional circlip and the relevant slot in the bell 30 for accessing the end gripping arms of the circlip. A substantially hermetic seal is ensured continuously around the splined coupling due to the sealing ring 21 being compressed between the bell joint 30 and the bearing unit 10. This arrangement, which provides for a sealing member 21 being compressed and, to some extent, protected by two facing surfaces 22, 33, is also more durable or reliable over time, particularly in comparison with a seal provided by a rubber sleeve as previously known, which are typically relatively thin and more delicate, and thus subject to deterioration. It will also be appreciated that the absence of angular play between the hub and the joint bell eliminates the noise that is often heard when the car is put into reverse with previously known splined couplings.

Variations and modifications of the foregoing are within the scope of the present invention. Those skilled in the art will readily recognize that the invention can be equally implemented if the involute splines are formed on the driving ring and the straight ones on the joint bell. Further, the retainer 40 may be generally formed as a rounded cap as opposed to a disc. Also, the connector 43 may be formed as a fastening pin with snap engaging portions instead of formed as a screw.

I claim:

1. A coupling assembly for releasably connecting a motor vehicle hub bearing unit with a constant velocity joint, the hub bearing unit including a rotatable hub having a driving ring with outer splines and a rotatable member with an end surface, the coupling assembly comprising:

a bell member of the constant velocity joint, the bell member including a generally tubular section disposed about the driving ring, the tubular section having an end surface facing the hub member end surface and an inner circumferential surface defining a bore, the inner surface having a plurality of inner splines engageable with the driving ring outer splines and a generally conical, tapering surface section;

an annular sealing member disposed between the hub member end surface and the bell tubular section end surface and configured to substantially seal the space between the two end surfaces;

a generally annular retainer disposed within the bell tubular section bore and having a generally conical, tapering outer circumferential surface engageable with the tapering inner surface section of the bore such that the bell tubular section is retained generally between the retainer outer surface and the hub end surface to prevent disengagement of the hub and bell splines and to compress the sealing member between the hub member end surface and the bell end surface; and a connector configured to connect the retainer with the hub.

2. The coupling assembly as recited in claim 1, wherein the hub has a central axial bore, the retainer has a threaded bore, and the connector includes a threaded member extending through the hub bore and threadably engaged with the retainer bore.

3. The coupling assembly as recited in claim 1, wherein the retainer substantially closes the bell member bore.

4. The coupling assembly as recited in claim 1 wherein:
the bell tubular section has an annular groove extending radially outwardly from the tapering inner surface section;
the retainer has an annular groove extending radially inwardly from the retainer outer surface; and
the coupling assembly further comprises a snap ring disposed within the retainer groove and extending radially outwardly into the bell tubular section groove.

5. The coupling assembly as recited in claim 1 wherein
the bell tubular section has an annular groove extending radially outwardly from the tapering inner surface section;
the retainer has an axially inner side; and
the coupling assembly further comprises a snap ring disposed within the bell portion groove and extending radially inwardly to engage the retainer inner axial end so as to provide an axial stop.

6. The coupling assembly as recited in claim 1 wherein the splines of the driving ring extend substantially axially and the splines of the bell tubular section extend at least partially circumferentially.

7. The coupling assembly as recited in claim 1 wherein the splines of the bell tubular section extend substantially axially and the splines of the driving ring extend at least partially circumferentially.

8. The coupling assembly as recited in claim 1 wherein the driving ring has an outer diameter and the rotatable member is a rotatable bearing member having an outer diameter greater than the driving ring outer diameter.

9. The coupling assembly as recited in claim 1 wherein the rotatable member end surface and the hub tubular section end surface are each radial surfaces.

10. An assembly for driving a motor vehicle wheel, the assembly comprising:

a hub bearing unit including a rotatable hub having a driving ring with outer splines and a rotatable member with an end surface;

a constant velocity joint including a bell member, the bell member having a generally tubular section disposed about the driving ring, the tubular section having an end surface facing the hub member end surface and an inner circumferential surface defining a bore, the inner surface having a plurality of inner splines engageable with the driving ring outer splines and a generally conical, tapering surface section;

an annular sealing member disposed between the hub member end surface and the bell tubular section end surface and configured to substantially seal the space between the two end surfaces;

a generally annular retainer disposeable within the bell tubular section bore and having a tapering outer circumferential surface engageable with the tapering inner surface section of the bore such that the bell tubular section is retained generally between the retainer outer surface and the hub end surface to prevent disengagement of the hub and bell splines and to compress the sealing member between the hub member end surface and the bell end surface; and a connector configured to connect the retainer with the hub.

* * * * *